(12) United States Patent
Nakasho

(10) Patent No.: US 9,007,453 B2
(45) Date of Patent: Apr. 14, 2015

(54) TIME LAPSE OBSERVATION METHOD, AND TIME LAPSE OBSERVATION APPARATUS AND MULTIPHOTON MICROSCOPE USED THEREFOR

(75) Inventor: Eiji Nakasho, Kyoto (JP)

(73) Assignee: Olympus Corporation, Tokyo (JP)

(*) Notice: Subject to any disclaimer, the term of this patent is extended or adjusted under 35 U.S.C. 154(b) by 339 days.

(21) Appl. No.: 13/603,696

(22) Filed: Sep. 5, 2012

(65) Prior Publication Data

US 2013/0063584 A1    Mar. 14, 2013

(30) Foreign Application Priority Data

Sep. 12, 2011   (JP) ................................. 2011-198861

(51) Int. Cl.
*H04N 7/18* (2006.01)
*G02B 7/36* (2006.01)
*G02B 21/00* (2006.01)
*G02B 21/36* (2006.01)
*H04N 9/82* (2006.01)

(52) U.S. Cl.
CPC ............ *G02B 7/365* (2013.01); *G02B 21/0076* (2013.01); *G02B 21/0084* (2013.01); *G02B 21/367* (2013.01); *H04N 9/8205* (2013.01)

(58) Field of Classification Search
CPC .. G02B 21/365; G02B 21/367; G02B 21/002; G02B 21/24; G01N 21/6458; H04N 7/18; H04N 7/183; H04N 7/181; H04N 7/188; H04N 9/3141; H04N 9/3176; G06F 3/0304; H01J 37/28; H01J 37/224; G08B 13/19656; G08B 13/19602; G08B 13/19652

USPC ........ 348/79, 80, 61, 143, 161; 359/368, 369, 359/443
IPC .................................................. H04N 9/47,7/18
See application file for complete search history.

(56) References Cited

U.S. PATENT DOCUMENTS

| | | |
|---|---|---|
| 5,369,430 A | 11/1994 | Kitamura |
| 8,150,137 B2 | 4/2012 | Maiya |
| 2009/0226061 A1 | 9/2009 | Maiya |
| 2010/0260422 A1 | 10/2010 | Ito et al. |
| 2013/0188033 A1* | 7/2013 | Oda et al. .......................... 348/79 |

FOREIGN PATENT DOCUMENTS

| | | |
|---|---|---|
| EP | 2 234 061 A1 | 9/2010 |
| JP | 5-137047 A | 6/1993 |
| JP | 2008-139579 A | 6/2008 |
| JP | 2009-152827 A | 7/2009 |

* cited by examiner

*Primary Examiner* — Sherrie Hsia
(74) *Attorney, Agent, or Firm* — Holtz, Holtz, Goodman & Chick PC

(57) ABSTRACT

Time lapse observation method includes: before a process to obtain a first time lapse image, capturing an image of a reference area on a sample being a partial area of a target area or an area in a vicinity of the target area being a smaller area than the target area to obtain a reference image; storing a position of a capturing area in capturing the reference image as a reference position; before a process to obtain the time lapse image performed, setting a position of the capturing area sequentially at different positions in the optical axis direction of an objective including the reference position and capturing an image at each of the positions to obtain comparison target images; and matching the capturing area with the target area, based on a comparison result of the reference image and the comparison target images.

19 Claims, 13 Drawing Sheets

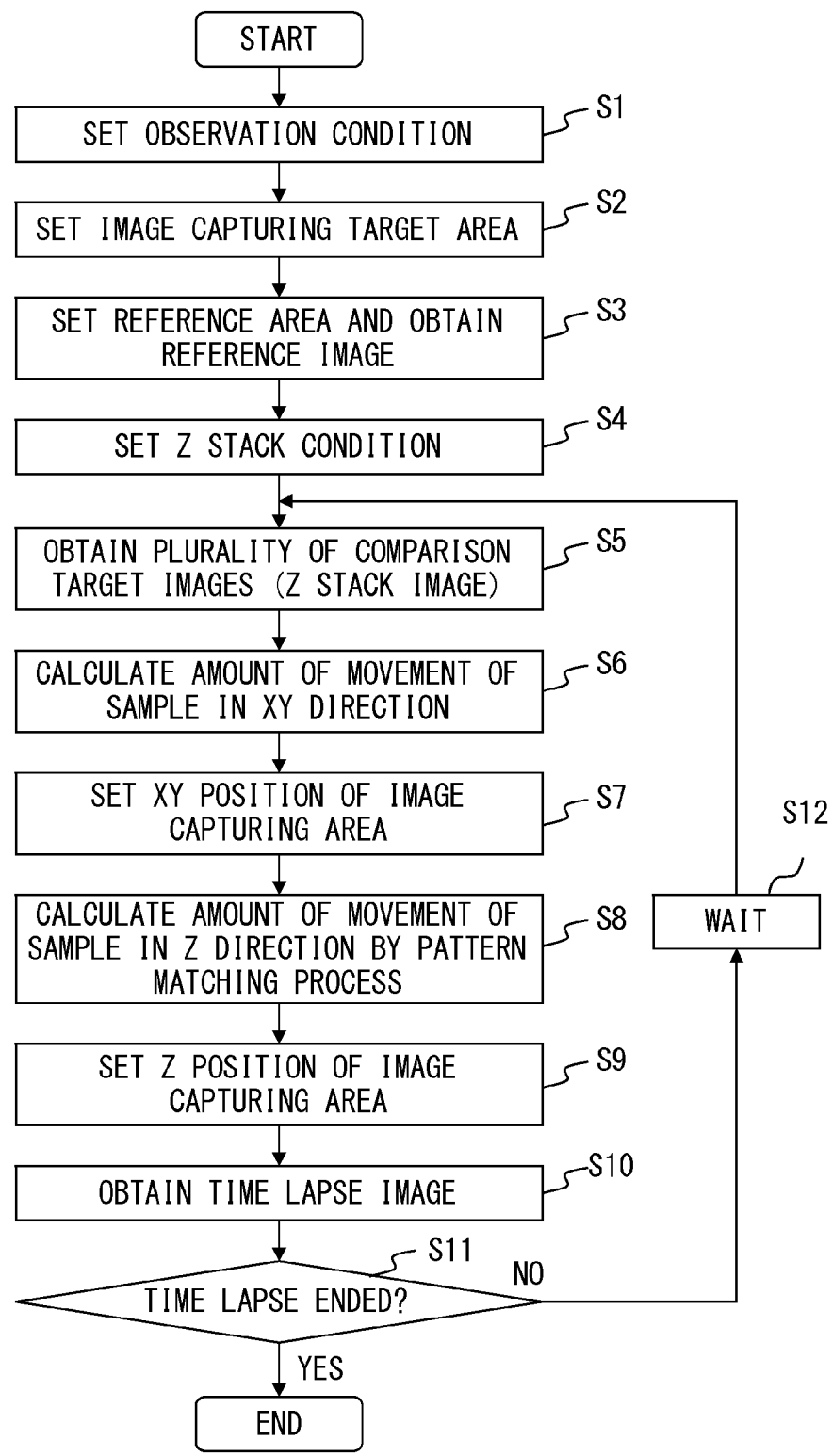
F I G. 4

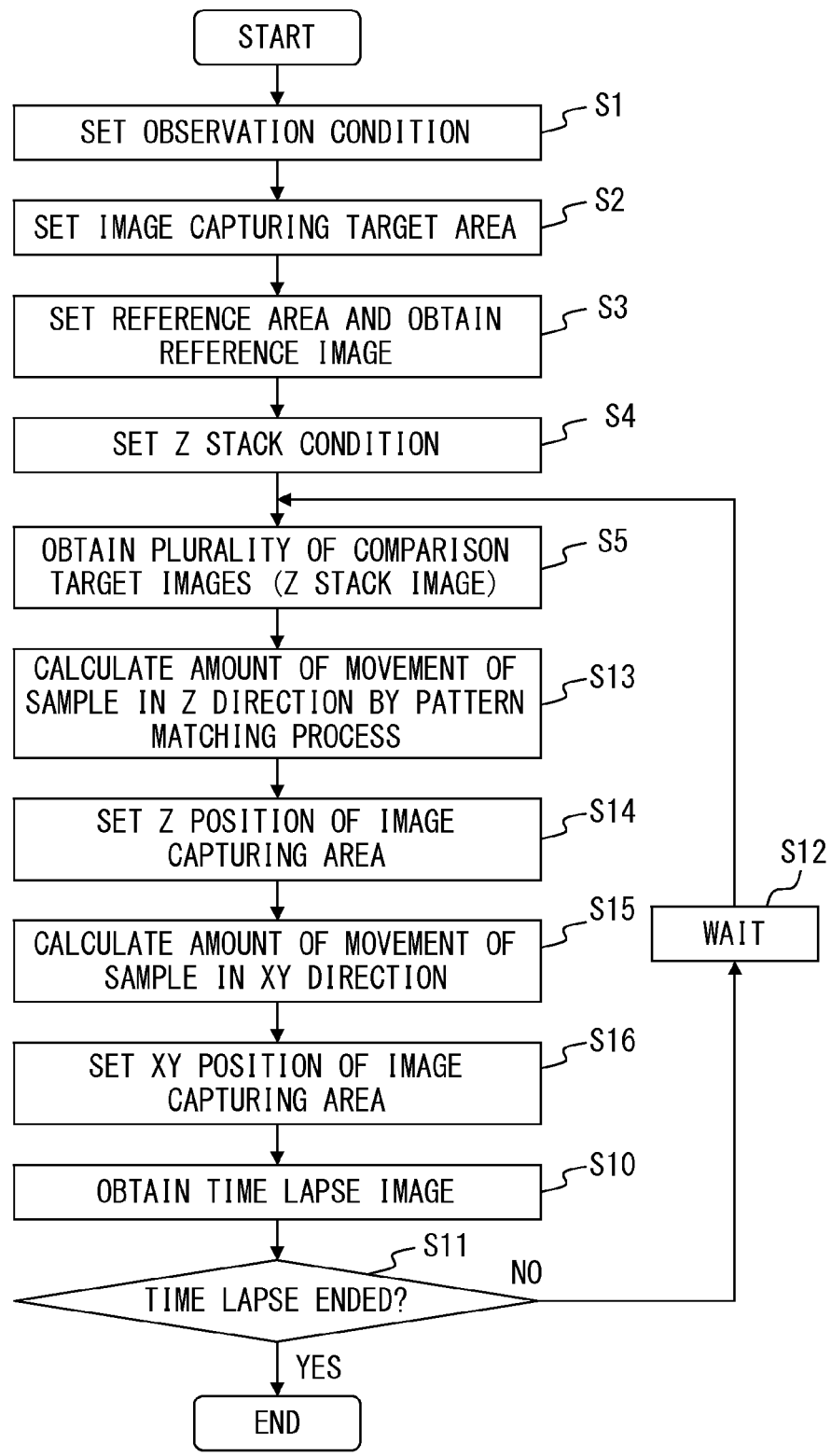
F I G. 5

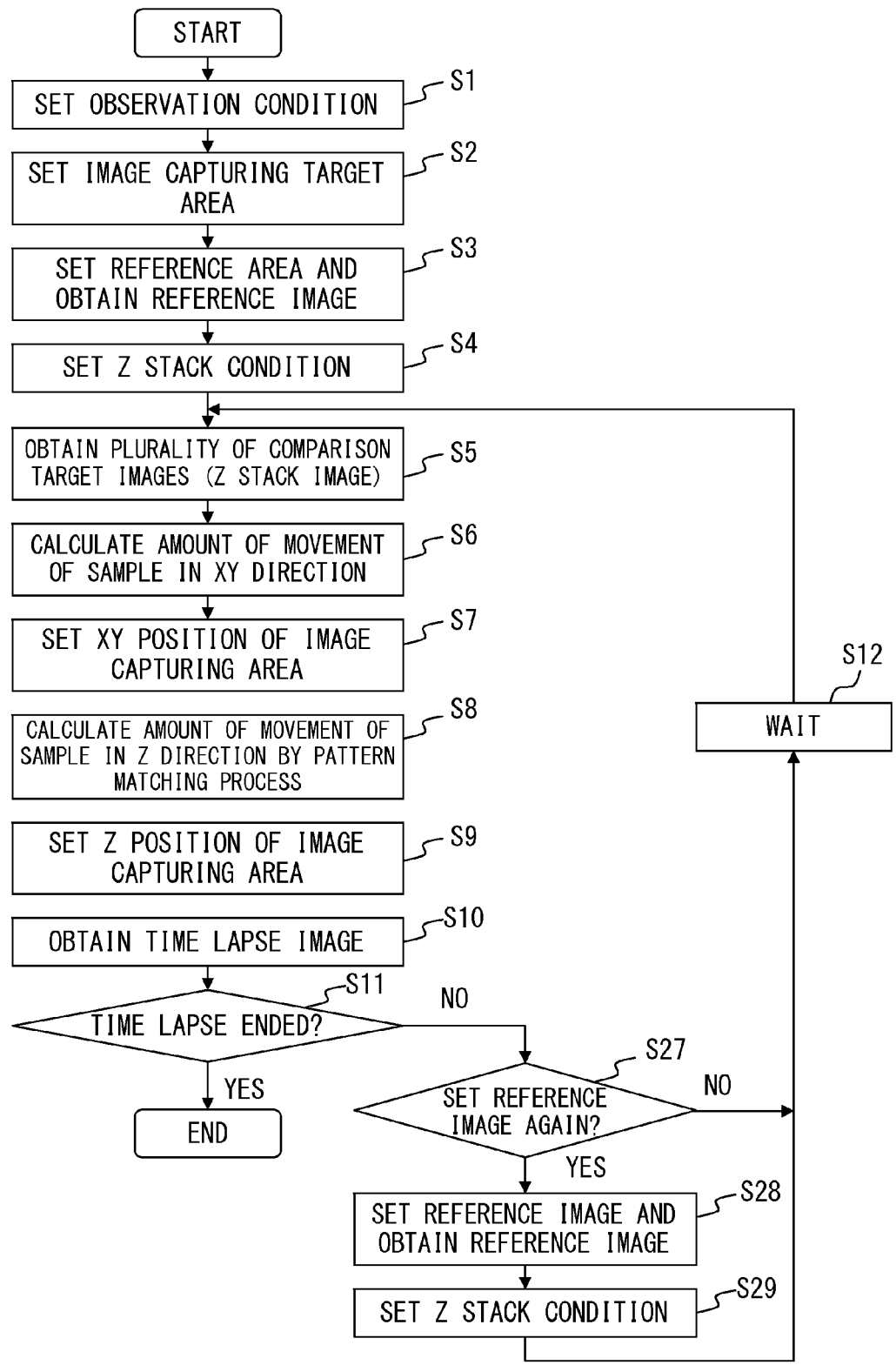
F I G. 1 0

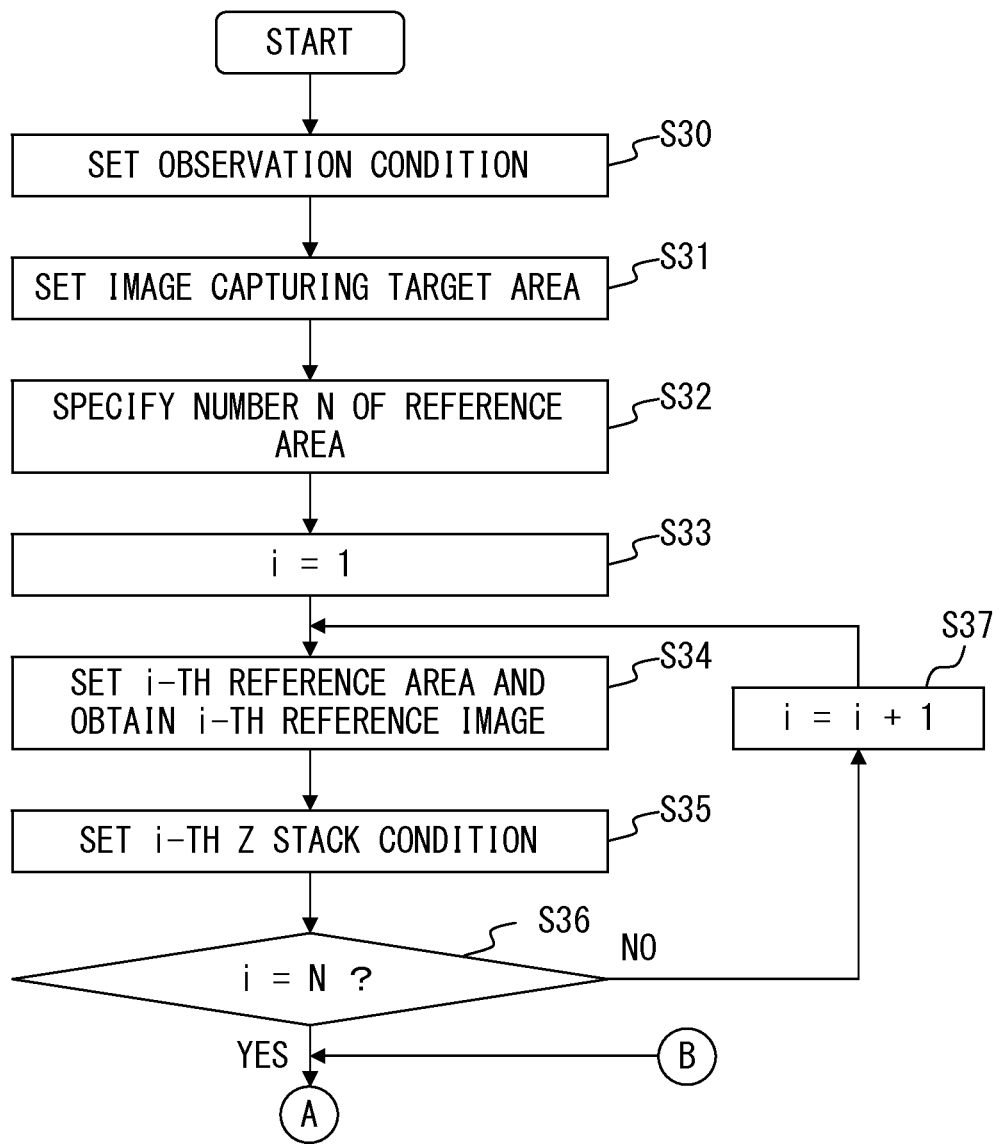
F I G. 11 A

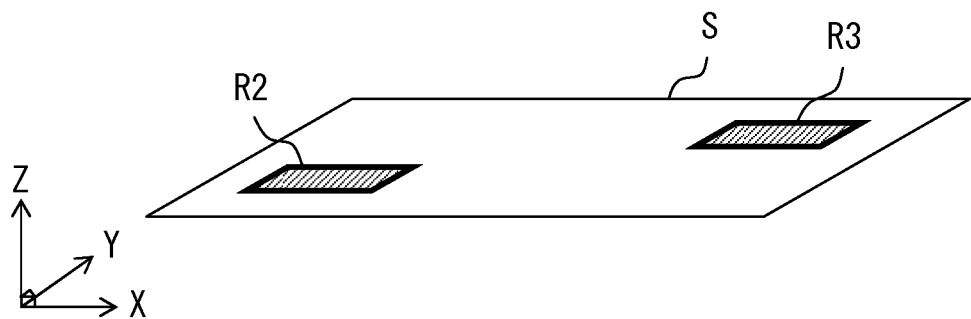
F I G. 1 2

TIME LAPSE OBSERVATION METHOD, AND TIME LAPSE OBSERVATION APPARATUS AND MULTIPHOTON MICROSCOPE USED THEREFOR

BACKGROUND OF THE INVENTION

Cross-reference to Related Application

This application is based upon and claims the benefit of priority from prior Japanese Patent Application No. 2011-198861, filed Sep. 12, 2011, the entire contents of which are incorporated herein by this reference.

1. Field of the Invention

The present invention relates to a time lapse observation method, and a time lapse observation apparatus and a multiphoton microscope, especially a time lapse observation method used in the in vivo observation, and a time lapse observation apparatus and a multiphoton microscope used for it.

2. Description of the Related Art

In the in vivo observation whose importance has been recognized in the field of biological studies, the time lapse observation has been performed generally to record the activity and change of a live sample.

Incidentally, in the time lapse observation, it is desirable in observing the activity and change of a sample to capture images of the same area of the sample (hereinafter, referred to as the image capturing target area) at certain time intervals. However, since a live sample moves from an image capturing area of an apparatus, it is not easy to constantly capture an image of the image capturing target area of the sample while matching the image capturing area that is actually captured in the image capturing and the image capturing target area of the sample.

Techniques related to such a problem is disclosed in, for example, Japanese Laid-open Patent Publication No. 2008-139579.

Japanese Laid-open Patent Publication No. 2008-139579 disclose a technique to track an observation target by selecting a slice image manually or automatically from image data of a plurality of slice images with different Z coordinates obtained in each round of the time lapse observation.

SUMMARY OF THE INVENTION

An aspect of the present invention provides a time lapse observation method matching the image capturing area with an image capturing target area on a sample set in advance, capturing an image of the image capturing target area at certain time intervals, to obtain a time lapse image includes: before a process to obtain the time lapse image for a first time, capturing an image of a reference area on the sample being a partial area of the image capturing target area or an area in a vicinity of the image capturing target area being a smaller area than the image capturing target area to obtain a reference image; storing a position and a size of the image capturing area in capturing the reference image as a reference position, reference size respectively, and before a process to obtain the time lapse image performed at certain time intervals, setting a position of the image capturing area sequentially at a plurality of different positions in the optical axis direction of an objective including the reference position and capturing an image at each of the plurality of positions to obtain a plurality of comparison target images; and matching the image capturing area in obtaining the time lapse image with the image capturing target area, based on a comparison result of the reference image and the plurality of comparison target images.

BRIEF DESCRIPTION OF THE DRAWINGS

The present invention will be more apparent from the following detailed description when the accompanying drawings are referenced.

FIG. 4 is a flowchart presenting the process of a time lapse observation performed in the time lapse observation apparatus according to embodiment 1.

FIG. 5 is a flowchart presenting a modification example of the process performed in the time lapse observation apparatus according to embodiment 1.

FIG. 10 is a flowchart presenting a modification example of the process performed in the time lapse observation apparatus according to embodiment 3.

FIG. 11A and FIG. 11B are flowcharts presenting the process of a time lapse observation performed in the time lapse observation apparatus according to embodiment 4.

FIG. 12 is a diagram for explaining a setting process of a reference area performed before obtaining a time lapse image in the time lapse observation apparatus according to embodiment 4.

DESCRIPTION OF EMBODIMENTS

Embodiment 1

Figure 1:
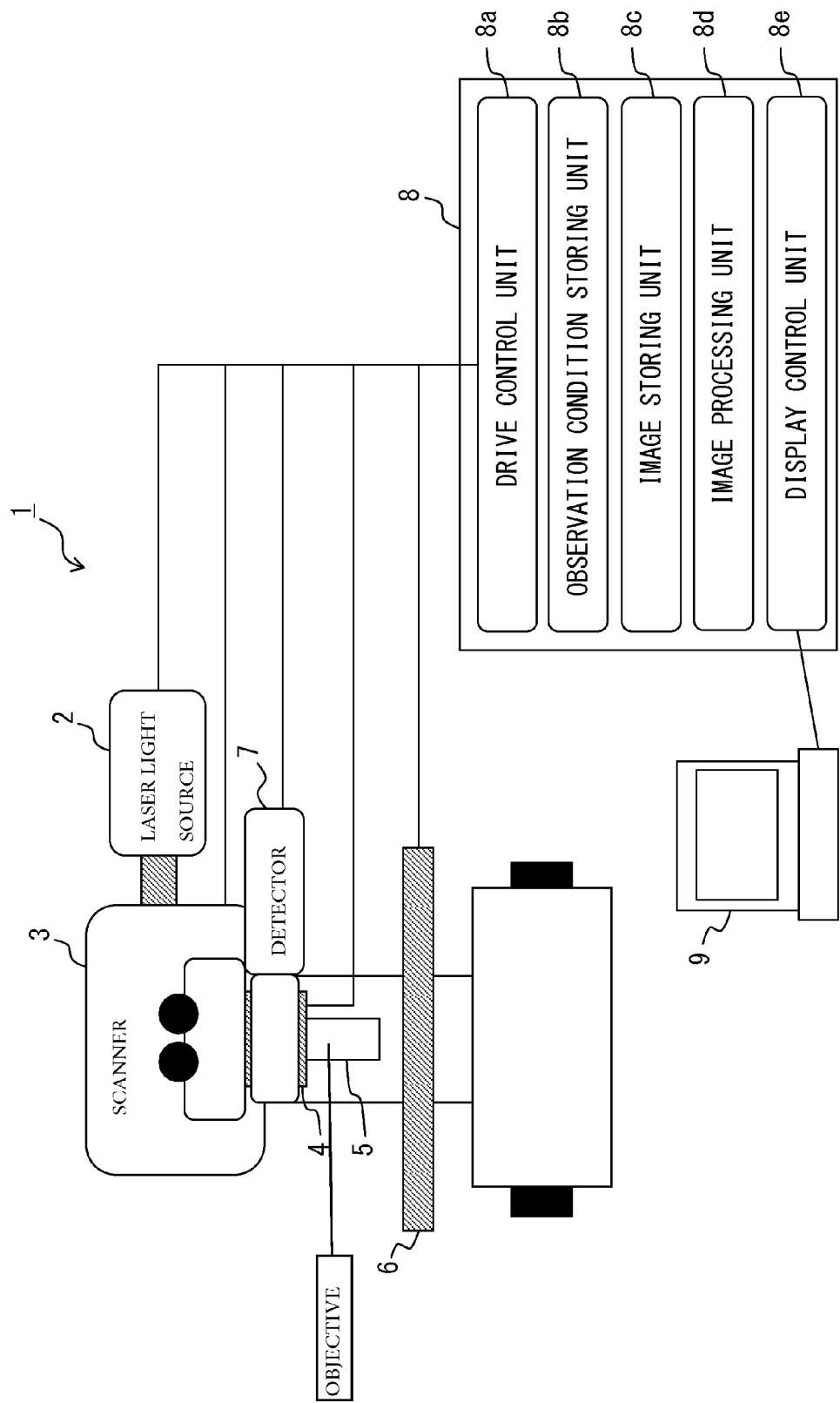
FIG. 1 is a diagram illustrating the configuration of a time lapse observation apparatus according to embodiment 1.

FIG. 1 is a diagram illustrating the configuration of a time lapse observation apparatus according to the present embodiment. First, with reference to FIG. 1, the configuration of a time lapse observation apparatus 1 according to the present embodiment is explained.

The time lapse observation apparatus 1 according to the present embodiment illustrated in FIG. 1 is an apparatus that obtains a time lapse image by capturing an image of the image capturing target area on a sample set in advance at certain time intervals. The sample is, for example, a biological sample that has a cell that emits fluorescence and collagen. In that case, the time lapse observation apparatus 1 is, for example, a second harmonic generation microscope or a multiphoton microscope, and the image (including time lapse image, reference image, and comparison target image described later)

obtained by the time lapse observation apparatus 1 is an SHG image, a fluorescent image and the like.

The Time lapse observation apparatus 1 has a laser light source 2 that emits laser light to irradiate the sample, a scanner 3 for scanning the sample by the laser light, a motorized nosepiece 4 on which an objective 5 is loaded, a motorized stage 6 on which the sample is placed, a detector 7 that detects light from the sample, a control apparatus 8 that controls the overall operation of the time lapse observation apparatus 1, and a display apparatus 9 that displays an image of the sample generated in the control apparatus 8.

The control apparatus 8 includes a drive control unit 8a, an observation condition storing unit 8b, an image storing unit 8c, an image processing unit 8d and a display control unit 8e.

The drive control unit 8a controls the driving of each component of the time lapse observation apparatus 1. For example, it controls the driving of the laser light source 2 to adjust the emitting intensity of the laser light. In addition, it controls the driving of the scanner 3 to adjust the scanning range and the scanning speed. In addition, it controls the motorized nosepiece 4 and the motorized stage 6 to change the image area obtained by the objective 5. Furthermore, it controls the driving of the detector 7 to adjust the detection sensitivity.

The observation condition storing unit 8b stores the observation condition of the time lapse observation by the time lapse observation apparatus 1. For example, it stores the certain time intervals to obtain the time lapse image, the number of times to obtain, and the like.

The image storing unit 8c stores, in addition to the time lapse image obtained in the time lapse observation apparatus 1, the reference image and the comparison target image described later.

The image processing unit 8d processes the image obtained in the time lapse observation apparatus 1. Specifically, for example, it performs an image generating process to generate an image based on a signal from the detector 7 and a signal from the drive control unit 8a that controls the scanner 3, and a pattern matching process of the reference image and the comparison target image described later.

The display control unit 8e controls the display on the display apparatus 9, and makes the display apparatus 9 display the time lapse image and the like.

FIG. 2A through FIG. 2D are diagrams for explaining a process performed before obtaining the time lapse image in the time lapse observation apparatus according to the present embodiment. The Z direction of the orthogonal coordinate system illustrated in FIG. 2A through FIG. 2D corresponds to the optical axis direction of the objective lens 5 illustrated in FIG. 1. FIG. 3 is a diagram presenting Z coordinates and correlation values of a plurality of comparison target images obtained in the time lapse observation apparatus according to the present embodiment.

The time lapse observation apparatus 1 captures the image of the image capturing target area of the sample even when the sample moves, by following the move. In order to realize this, before the time lapse observation apparatus 1 captures the time lapse image, the time lapse observation apparatus 1 performs a process to match the image capturing area with the image capturing target area on the sample.

Meanwhile, the image capturing area herein refers to the area whose image is captured by the time lapse observation apparatus, which is an area of the sample determined based on the time lapser observation apparatus. It does not refer to the area (light receiving area) of the imaging element in the detector 7. Meanwhile, the image capturing target area refers to a specific area of the sample whose image should be captured by the time lapser observation apparatus, which is an area determined based on the sample. Therefore, even if the sample moves, unless the time lapse observation apparatus operates, the image capturing area does not move, but by contrast, the image capturing target area moves when the sample moves.

Hereinafter, referring to FIG. 2A through FIG. 2D, the processing operation performed by the time lapse observation apparatus 1 to match the image capturing area with the image capturing target area on the sample is explained. Meanwhile, matching the image capturing area with the image capturing target area mentioned herein has a meaning such as to perform position alignment of the image capturing area and the image capturing target area, and includes, in addition to the case of performing position alignment so as to exactly match the image capturing area with the image capturing target area, the case of aligning the position so that they approximately match.

Figure 2A:
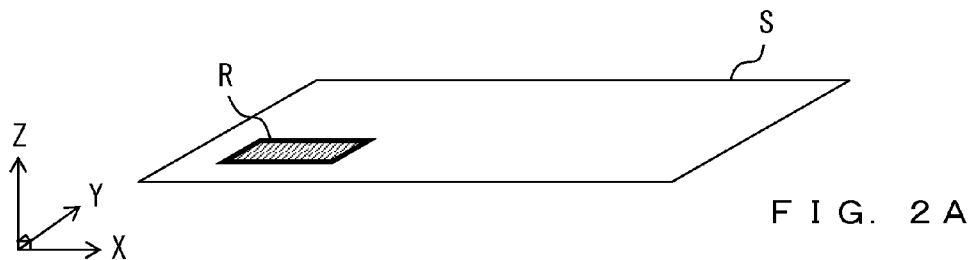
FIG. 2A through FIG. 2D are diagrams illustrating a process performed before obtaining a time lapse image in the time lapse observation apparatus according to embodiment 1.
Figure 3:
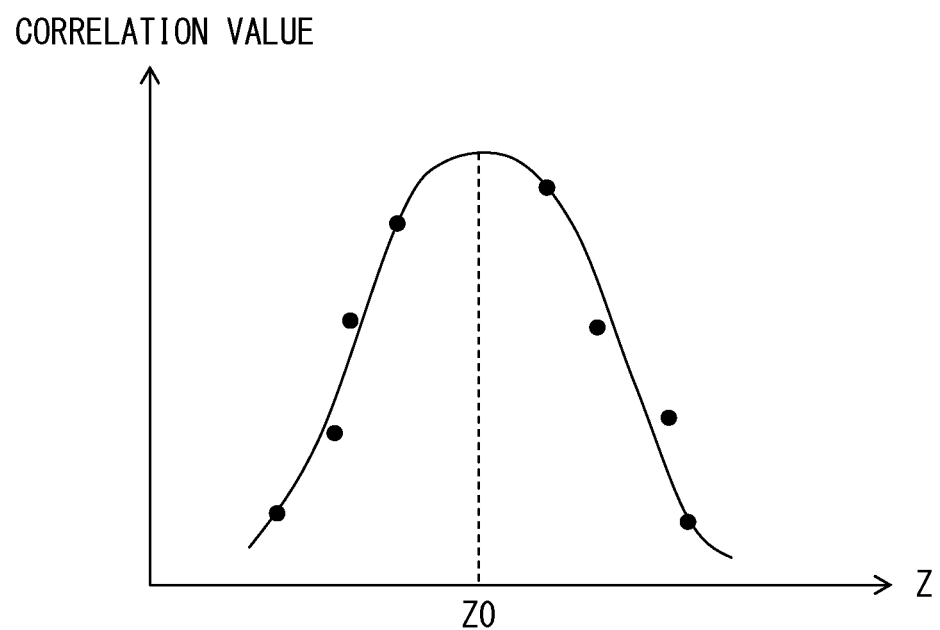
FIG. 3 is a diagram presenting Z coordinates and correlation values of a plurality of comparison target images obtained in the time lapse observation apparatus according to embodiment 1.

FIG. 2A illustrates an image capturing target area S being an area on the sample from which the time lapse image is obtained in the time lapse observation, and a reference area R being a partial area of the image capturing target area S. Meanwhile, as well as the image capturing target area S, the reference area R also refers to a specific area on the sample, which is determined based on the sample.

First, in the time lapse observation apparatus 1, before obtaining the time lapse image for the first time after the time lapse observation start, the image capturing target area S is set while viewing the image of the sample displayed by the display apparatus 9, and the position (hereinafter, described as the initial position) and the size of the image capturing target area S at the time of the setting are respectively stored in the observation condition storing unit 8b.

Furthermore, while viewing the image of the sample displayed by the display apparatus 9, a partial area of the image capturing target area S is set as the reference area R. Then, an image of the reference area R is captured, and the obtained image is stored in the image storing unit 8c as the reference image. In addition, the position and the size of the image capturing area at the time of capturing the reference image are stored in the observation condition storing unit 8b as the reference position, reference size, respectively.

Thus, with the observation condition storing unit 8b storing the position (initial position) of the image capturing target area S and the position (reference position) of the reference area R before obtaining the time lapse image for the first time, the positional relationship between the image capturing target area S and the reference area R is specified in advance.

Meanwhile, these positions stored in the observation condition storing unit 8b are positions based on the time lapse observation apparatus 1. That is, when the sample moves, the positions of the image capturing target area S and the reference area R become different from the initial position and the reference position, respectively.

Next, when the time (hereinafter, referred to as the time lapse time) at which the time lapse image should be obtained approaches, the time lapse observation apparatus 1 performs the operation illustrated in FIG. 2B through FIG. 2D before obtaining the time lapse image, to match the image capturing area with the image capturing target area S on the sample.

Figure 2B:

FIG. 2B illustrates the way in which Z stack images with respect to the reference area capture. First, the time lapse observation apparatus 1 reads out the reference position and the reference size stored in the observation condition storing unit 8b and sets the size and the position of the image capturing area as the reference size and the reference position, respectively. Furthermore, setting is sequentially performed to a plurality of positions with a difference only in the position in the Z direction (the optical axis direction of the objective 5) with respect to the reference position. At this time, by capturing the image by scanning a comparison target area (comparison target areas M1 through M7) of the equal size as the reference area R at the respective positions (the reference position and the plurality of different positions), a plurality of images (hereinafter, described as the comparison target image) being the Z stack images with respect to the reference position are obtained. The obtained plurality of images are stored in the image storing unit 8c. Meanwhile, in FIG. 2B, the position of the comparison target area M4 is the reference position.

Figure 2C:
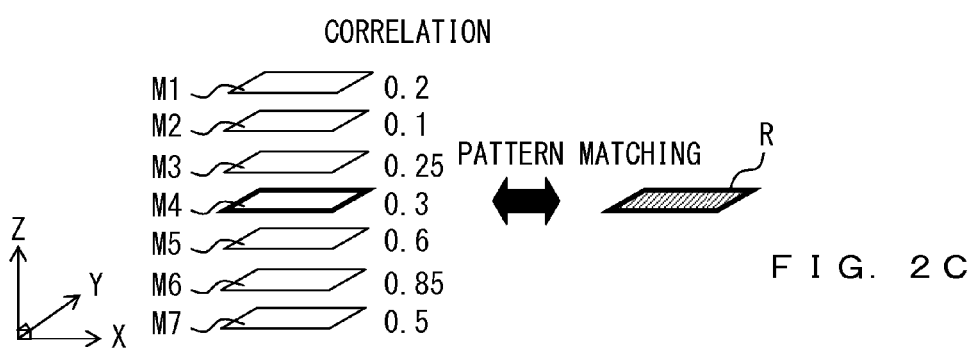

FIG. 2C presents the result of the pattern matching process of the reference image with each of the plurality of comparison target images capturing the images of the comparison target areas M1 through M7. In the time lapse observation apparatus 1, the image processing unit 8d obtains the correlation value between the reference image and each comparison target image as presented in FIG. 2C, by performing the pattern matching process of the reference image with each comparison target image stored in the image storing unit 8c. Then, the comparison target image having the highest correlation is specified by the comparison with the reference image. When a correlation coefficient is performed generally, the correlation value takes a value from −1 to 1. When the value is negative, there is a negative correlation, and when it is positive, there is a positive correlation, and when the value is 1, it follow that the images are identical.

In the example presented in FIG. 2C, the comparison target image being an image captured from the comparison target area M6 is identified as the image having the highest correlation. Meanwhile, the method of the pattern matching process performed by the image processing unit 8d is not particularly limited, and any existing method may be used.

Figure 2D:
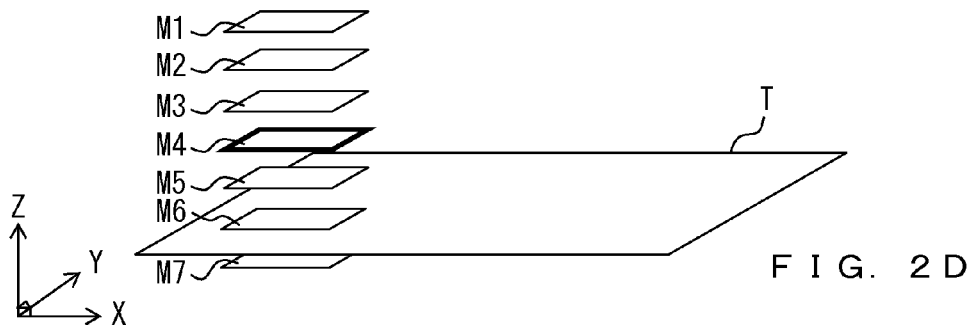

FIG. 2D presents the way in which the image capturing area T is matched with the image capturing target area S on the sample. The time lapse observation apparatus 1 matches the image capturing area T of the time lapse image with the image capturing target area S on the sample, based on the comparison result of the reference image and the plurality of comparison target images.

From the result of the pattern patching process, it is estimated that, after setting the image capturing target area S and the reference area R in FIG. 2A, the reference area R on the sample moved from the reference position (position of the comparison target area M4) to the position of the comparison target area M6. Therefore, it is estimated that the image capturing target area S also moved in the direction in which the reference area R on the sample moved, by the same amount of movement.

In view of this, the image capturing area T is set at the position that is moved in the same direction as the movement of the reference area R from the initial position (the position of the image capturing target area S in FIG. 2A) by the same amount of movement. That is, here, the Z position of the image capturing area T is matched with the Z position of the comparison target area M6. Furthermore, the size of the image capturing area T is set as the same size as the size of the image capturing target area S stored in the observation condition storing unit 8b. Accordingly, the positional relationship between the image capturing area T and the comparison target area M6 matches the positional relationship of the image capturing target area S and the reference area R, and the image capturing area T matches the image capturing target area S of the sample at the current time.

By performing the process as described above, the time lapse observation apparatus 1 is able to match the image capturing area T and the image capturing target area S on the sample, when obtaining the time lapse image.

Meanwhile, in FIG. 2A through FIG. 2D, an example in which the amount of movement of the reference area R (that is, the sample) is calculated by identifying the comparison target having the highest correlation with the reference image is provided above, but the method to calculate the amount of movement of the sample is not particularly limited to this method. In order to calculate the amount of movement of the sample more precisely, for example, as illustrated in FIG. 3, a function that indicates the relationship between the Z coordinate and the correlation value may be calculated from Z coordinates and correlation values of a plurality of comparison target images by using the least-square method for example. Then, the amount of movement of the sample may be calculated estimating that the reference area R moved to the Z coordinate (Z0 in FIG. 3) at which the correlation is largest in the function, FIG. 4 is a flowchart presenting the process of the time lapse observation performed in the time lapse observation apparatus according to the present embodiment. With reference to FIG. 4, the process flow of the time lapse observation apparatus 1 is explained specifically.

First, in step S1, the observation condition of the time lapse observation apparatus 1 is set by the user, and the observation condition storing unit 8b stores the set condition. The observation conditions set in step S1 are, for example, a certain time interval to obtain the time lapse image (hereinafter, described as the time lapse interval) and the number to obtain the time lapse image, the emitting intensity of the laser light of the laser light source 2 and the scanning speed of the scanner 3 in obtaining the time lapse image, and the like.

In step S2, the area of the sample that should be imaged as the time lapse image is set by the user as the image capturing target area. The user sets the image capturing target area while viewing the image of the sample displayed on the display apparatus 9. For example, if the entirety of the area of the sample displayed on the display apparatus 9 (hereinafter, described as the observation area) is set as the image capturing target area, the user sets the image capturing target area by operating the time lapse observation apparatus 1 and by adjusting the observation area. when a partial area in the observation area is set as the image capturing target area, the user adjusts the observation area, and after that, sets the image capturing target area within the area. The observation condition storing unit 8b stores the position (initial position) and the size of the image capturing target area.

In step S3, a partial area in the image capturing target area is set by the user as the reference area. The user sets the reference area while viewing the image of the sample displayed by the display apparatus 9.

The time lapse observation apparatus 1 captures the image of the set reference area by scanning by the scanner 3, to obtain the reference image. The image storing unit 8c stores the reference image. The observation condition storing unit 8b stores the position and the size of the image capturing area at the time of capturing the reference image as the reference position and the reference size, respectively, In step S4, the condition (hereinafter, referred to as the Z stack condition) to obtain a plurality of comparison target images being the Z stack images with respect to the reference position is set by the user, and the observation condition storing unit 8b stores the set Z stack condition. The Z stack conditions set in step S4 are, for example, the number and interval of Z stacks in obtaining the comparison target image, the emitting intensity of the laser light from the laser light source 2 and the scanning speed of the scanner 3 in obtaining the comparison target image. Meanwhile, since it is desirable that the comparison target image and the reference image are obtained in the same conditions, the Z stack conditions (particularly the emitting intensity of the laser light and the scanning speed, and the like) may be set before obtaining the reference image in step S3.

It is desirable that the emitting intensity of the laser light set in step S4 is set to a weaker intensity than the emitting intensity of the laser light set in step S1, and the scanning speed is set to a faster speed than the scanning speed set in step S1. In addition, in order to obtain a comparison target image with a sufficient image quality for performing the pattern matching process described later, it is desirable to set the detection sensitivity of the detector 7 to a high sensitivity according to these settings. Specifically, the gain and offset are set high.

When the above settings are completed, the time lapse process performed at certain time intervals (time lapse interval) according to the set conditions starts. Meanwhile, the process after that is performed automatically by the time lapse observation apparatus without intervention of the operation by the user. In addition, the processes in step S3 and step S4 may also be performed automatically according to criteria set in advance.

In step S5, the time lapse observation apparatus 1 obtains a plurality of comparison target images. Specifically, the time lapse observation apparatus 1 first reads out the reference position, the reference size, the Z stack condition (the number of Z stacks, the Z stack interval, the emitting intensity of the laser light, the scanning speed, the detection sensitivity, and the like), stored in the observation condition storing unit 8b. Then, the image of the area of the reference size is captured at each of the positions including the reference position and shifted in the Z directions by the Z stack interval, to obtain the comparison target images for the amount of the number of Z stacks. The image storing unit 8c stores the obtained comparison target images.

In step S6, the time lapse observation apparatus 1 calculates the amount of movement of the sample in the XY direction. Specifically, the image processing unit 8d of the time lapse observation apparatus 1 calculates the amount of movement of the sample in the XY direction by comparing the reference image obtained in step S3 and a given comparison target image obtained in step S5 (for example, the comparison target image captured at the reference position). Any existing method may be used for the calculation of the amount of movement.

Meanwhile, in step S6, the amount of movement of the sample in the Z direction has not been calculated yet. Therefore, an arbitrarily selected comparison target image is, normally, an image obtained in the condition in which the focal position of the objective 5 is on a different Z position with respect to the sample from the Z position when obtaining the reference image. Therefore, arbitrarily selected comparison target images are images focusing on different Z positions of the sample. However, as long as the difference of the Z position is small, mostly no problem occurs.

In step S7, the time lapse observation apparatus 1 sets the XY position of the image capturing area to obtain the time lapse image. Specifically, the time lapse observation apparatus 1 sets the XY position of the image capturing area to obtain the time lapse image to a position moved from the initial position by the amount of movement in the XY direction calculated in step S6.

The time lapse observation apparatus 1 is able to match the XY position of the image capturing area in obtaining the time lapse image and the XY position of the image capturing target area by changing the scanning area of the scanner 3 according to the setting in step S7. The XY position of the image capturing area in obtaining the time lapse image and the XY position of the image capturing target area may also be matched by moving the motorized stage 6 in the XY direction.

In step S8, the time lapse observation apparatus 1 performs the pattern matching process to calculate the amount of the movement of the sample in the Z direction. Specifically, the image processing unit 8d of the time lapse observation apparatus 1 performs the pattern matching process of the reference image obtained in step S3 and each of the plurality of comparison target images obtained in step S5, to obtain the correlation value of each comparison target image with the reference image. Then, from the relation between the Z position of the comparison target area, on which the comparison target image having the highest correlation is captured, and the Z position of the reference position, the amount of movement of the sample in the Z direction is calculated. The correlation value with a higher accuracy may be obtained by obtaining the correlation value with the reference image in the condition in which the XY movement amount determined in step S6 is applied to the comparison target image and the comparison target image is shifted in the XY direction.

In step S9, time lapse observation apparatus 1 sets the Z position of the image capturing area to obtain the time lapse image. Specifically, the time lapse observation apparatus 1 sets the Z position of the image capturing area to obtain the time lapse image to a position moved from the initial position by the amount of movement in the Z direction calculated in S8.

Time lapse observation apparatus 1 is able to match the Z position of the image capturing area in obtaining the time lapse image with the Z position of the image capturing target area by moving the objective 5 in the Z direction according to the setting instep S9. In addition, the Z position of the image capturing area in obtaining the time lapse image and the Z position of the image capturing target area may also be matched by moving the motorized stage 6 in the Z direction.

In step S10, the time lapse observation apparatus 1 obtains the time lapse image. Specifically, the time lapse observation apparatus 1 sets the size of the image capturing area to the same size as the size of the image capturing target area stored in the observation condition storing unit 8b. In addition, the emitting intensity of the laser light of the laser light source 2 and the scanning speed of the scanner 3 are also changed to the setting in obtaining the time lapse image stored in the observation condition storing unit 8b. After that, according to the time lapse time calculated from the certain time interval (time lapse interval) stored in the observation condition storing unit 8b, the image capturing target area of the sample corresponding to the image capturing area is captured, to obtain the time lapse image. The image storing unit 8c stores the obtained time lapse image.

In step S11, whether or not the time lapse observation apparatus 1 has obtained the time lapse image for the certain number to obtain stored in the observation condition storing unit 8b is judged.

When the time lapse image has not been obtained for the certain number to obtain, the time lapse observation apparatus 1 waits until the next time lapse time approaches (step S12). Then, after that, the processes from step S5 to step S11 are repeated. Meanwhile, it is desirable that, as the wait time interval, for example, a time interval is as close to the time lapse interval as possible in consideration of the processing time from the step S5 to step S10. On the other hand, when the time lapse image has been obtained for the certain number to obtain, the time lapse observation apparatus 1 terminates the process.

As described above, according to the time lapse observation apparatus 1, even when the sample moves, the image capturing area can be matched with the image capturing target area on the sample, following the movement of the sample. Accordingly, in the time lapse observation, while suppressing the damage given to the sample, the time lapse image capturing a certain image capturing target area of a live sample can be obtained. Therefore, the certain area of the sample can be observed in the status in which the sample is kept live for a long time.

In addition, in the time lapse observation apparatus 1, the time lapse image is obtained separately from the image to be obtained (comparison target image) to follow the movement of the sample. Accordingly, the timing to obtain the time lapse image may be managed precisely by a schedule.

In addition, in the time lapse observation apparatus 1, the Z stack image (comparison target image) is obtained by irradiating a smaller area (the comparison target areas M1 through M7 in FIG. 2B) compared with the image capturing target area to obtain the time lapse image with the laser light. Accordingly, the damage on the sample by the process before obtaining the time lapse image is extremely limited, and for example, compared with the conventional sample following technique to irradiate the entirety of the image capturing target area with the laser light to obtain the Z stack image, the damage given to the sample may be significantly suppressed. Furthermore, since the area to obtain the Z stack image is small, the time required to obtain the Z stack image may also be shorter than conventionally.

In addition, by irradiation with a smaller light amount per unit area compared with the light amount of the laser light per unit area to irradiate the image capturing target area in obtaining the time lapse image and by obtaining the Z stack image (comparison target image), the damage given to the sample may be further suppressed.

As the specific method to suppress the damage on the sample by suppressing the light amount of the laser light per unit area, there are following methods, for example. Firstly, there is a method to obtain the Z stack image (comparison target image) by irradiation with the laser light for a shorter irradiation time per unit area than the irradiation time per unit area to irradiate the image capturing target area with the light in obtaining the time lapse image. In addition, secondly, there is a method to obtain the Z stack image by irradiation with the light of a weaker intensity compared with the intensity of the light to irradiate the image capturing target area in obtaining the time lapse image. In either of the method, the fact that the sufficient image quality required for the comparison target image is lower than the image quality of the time lapse image is utilized. Meanwhile, in this case, to suppress the degradation of the image within the range in which the amount of the movement of the sample can be calculated, it is desired to operate the detector 7 with higher detection sensitivity.

Meanwhile, the time lapse observation apparatus 1 according to the present embodiment may be applied to various microscopes used in the in vivo observation. Among them, application to a microscope in which it is impossible to adopt a method to follow the movement of the sample in the Z direction using an existing focusing method such as the contrast AF, for example, a multiphoton microscope is especially preferable. The multiphoton microscope is preferable, also from the viewpoint of its features such as that it is possible to observe the deep portion of the sample, the damage on the sample may be suppressed, for example.

Meanwhile, FIG. 4 presents an example, regarding the following in the XY direction, in which the image capturing area is matched with the image capturing target area on the sample based on the amount of movement in the XY direction calculated in step S6. However, the following in the XY direction may be performed in the following method. For example, immediately before the step S10, the image processing unit 8*d* may compare the reference image obtained in step S3 with a comparison target image that has the highest correlation obtained in step S8 to calculate the amount of movement of the sample in the XY direction, and the image capturing area may be matched with the image capturing target area on the sample based on the calculated amount of the movement.

In addition, FIG. 4 is explained with an example of the case in which the amount of movement of the sample in the XY direction is relatively small. When the image capturing target area has moved outside the observation area such as in the case in which the amount of movement in the XY direction calculated in step S6 is relatively large, for example, it is desirable to use the following method together.

Before obtaining the comparison target image in step S5, first, the size of the image capturing area is set to the same size as that of the image capturing target area, and after that, the Z stack image is separately obtained with a broader interval than the Z stack width of the comparison target image obtained in step S5. Then, those obtained images and the last time lapse image are compared, and then, the image capturing area is matched with the image capturing target area on the sample while allowing for a certain degree of misalignment. After that, furthermore, in order to match the image capturing area with a high accuracy with the image capturing target area on the sample, the processes on and after step S5 are performed.

By using the method as described above together with the method illustrated in FIG. 4, even in the case in which the movement amount of the sample is large, it becomes possible to follow the sample while suppressing the damage given to the sample.

Figure 6:
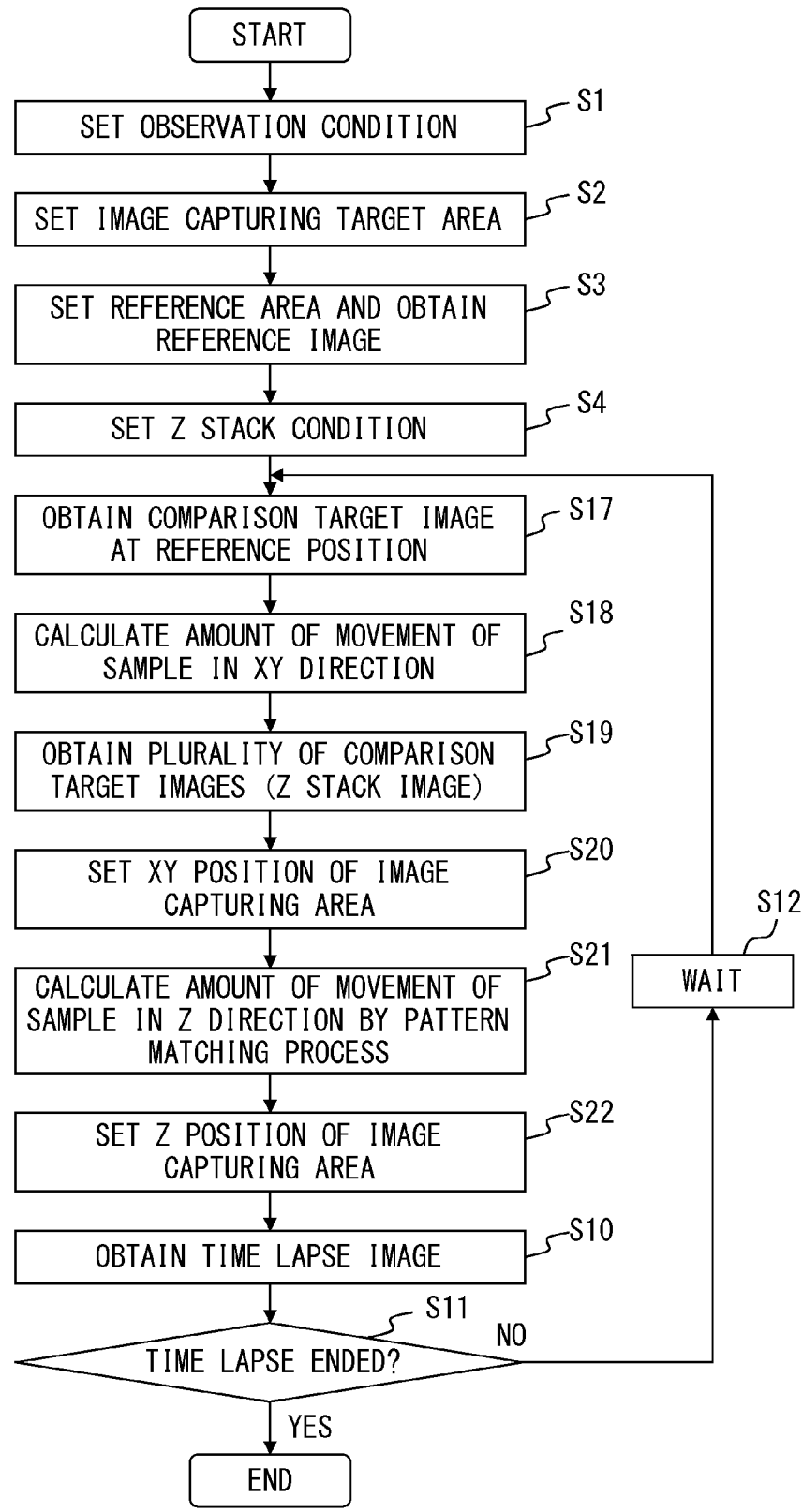
FIG. 6 is a flowchart presenting another modification example of the process performed in the time lapse observation apparatus according to embodiment 1.

FIG. 5 and FIG. 6 are flowcharts respectively presenting a modification example of the process of the time lapse observation performed in the time lapse observation apparatus according to the present embodiment. Meanwhile, the same step number is assigned to the same process as the process described in FIG. 4, and explanation is omitted.

The process flow of the time lapse observation illustrated in FIG. 5 differs from the process flow from the time lapse observation apparatus 1 presented in FIG. 4 in including the processes presented in step S13 through step S16 instead of the processes presented in step S6 through S9.

In the time lapse observation apparatus 1 that operates in the process flow illustrated in FIG. 5, after obtaining a plurality of comparison target images in step S5, a pattern matching process is performed to calculate the amount of movement of the sample in the Z direction by the image processing unit 8*d* (step S13). Then, the time lapse observation apparatus 1 sets the Z position of the image capturing area based on the calculated amount of movement in the Z direction (step S14). Meanwhile, the processes in step S13, step S14 are the same as the processes in step S8, step S9 illustrated in FIG. 4.

After that, the amount of movement of the sample in the XY direction is calculated (step S15). This process is a process corresponding to step S6 illustrated in FIG. 4. However, step S15 differs from step S6 illustrated in FIG. 4 in calculating the amount of movement in the XY direction of the sample by comparing the reference image and the comparison target image specified by the image having the highest correlation in step S13.

Then, the time lapse observation apparatus 1 sets the XY position of the image capturing area based on the amount of movement in the XY direction calculated in step S15 (step S16). The process in step S16 is the same as the process in step S7 illustrated in FIG. 4, The time lapse observation apparatus 1 according to the present embodiment is able to have, even when it is configured to perform the modification example of the process of the time lapse observation illustrated in FIG. 5, the same effect as when it is configured to perform the process in the time lapse observation illustrated in FIG. 4. Furthermore, when performing the process illustrated in FIG. 5, since the amount of movement in the XY direction is calculated by comparing images whose positions in the Z direction are matched, the calculation accuracy of the amount of movement in the XY direction improves, and as a result, it becomes possible to match the image capturing area and the image capturing target area with a higher accuracy. Therefore, it becomes possible to obtain the time lapse image capturing a certain image capturing target area of a live sample with a high accuracy, while suppressing the damage given to the sample.

The process flow of the time lapse observation illustrated in FIG. 6 differs from the time lapse observation apparatus 1 illustrated in FIG. 4 in including the processes presented in step S17 through step S22 instead of the processes presented in step S5 through step S9.

The time lapse apparatus 1 that operates in the process flow illustrated in FIG. 6 first sets, after setting the Z stack condition in step S4 (or, after waiting until the time lapse time approaches in step S12), the position and size of the image capturing area to the reference position and reference size respectively, and then obtain a comparison target image (step S17). Then, the image processing unit 8d calculates the amount of movement of the sample in the XY direction by comparing the reference image with the comparison target image obtained in step S17 (step S18).

After that, the time lapse observation apparatus 1 obtains a plurality of comparison target images used for calculating the amount of movement of the sample in the Z direction (step S19). However, in step S19, after the time lapse observation apparatus 1 moves the position of the image capturing area from the reference position by the amount of movement in the XY direction calculated in step S18, the comparison target images for the number of Z stacks are obtained by capturing the area of the reference size at the respective positions shifted in the Z direction by the Z stack interval from each other including the position after the movement.

Then, the time lapse observation apparatus 1 sets the XY position of the image capturing area to obtain the time lapse image based on the amount of movement in the XY direction calculated in step S18 (step S20). Furthermore, a pattern matching process is performed to calculate the amount of movement in the Z direction in the sample (step S21), and the Z position of the image capturing area to obtain the time lapse image is set based on the calculated amount of movement in the Z direction (step S22). Meanwhile, the processes in step S20 through step S22 are the same as the processes in step S7 through step S9 in FIG. 4.

The time lapse observation apparatus 1 according to the present embodiment is able to have, even when it is configured to perform the modification example of the process of the time lapse observation illustrated in FIG. 6, the same effect as when it is configured to perform the process in the time lapse observation illustrated in FIG. 4. Furthermore, when performing the process illustrated in FIG. 6, since the amount of movement in the Z direction is calculated by comparing images whose positions in the XY direction are matched, the calculation accuracy of the amount of movement in the Z direction improves. As a result, it becomes possible to match the image capturing area and the image capturing target area with a higher accuracy.

Embodiment 2

Figure 7:
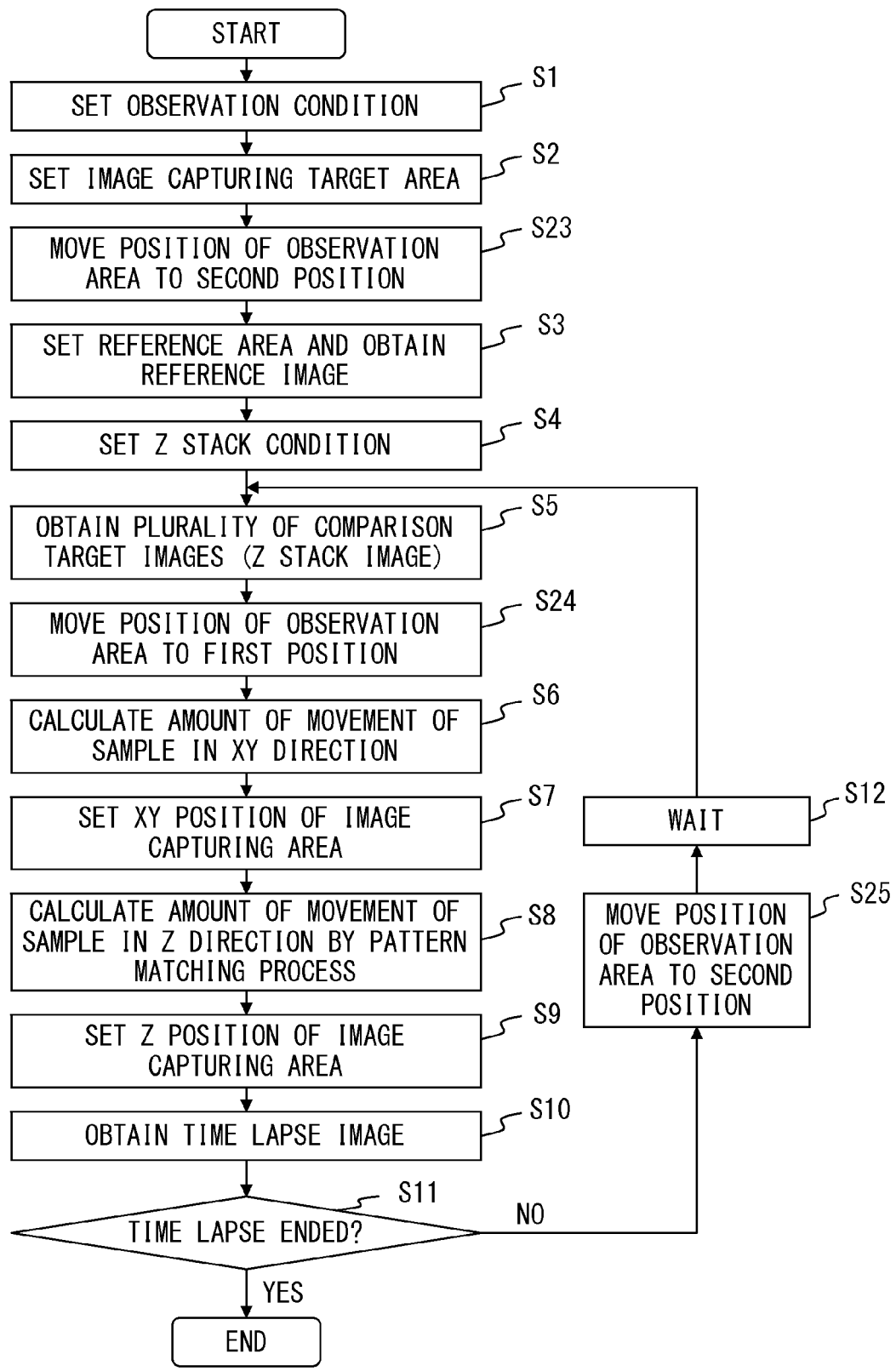
FIG. 7 is a flowchart presenting the process of a time lapse observation performed in a time lapse observation apparatus according to embodiment 2.
Figure 8:
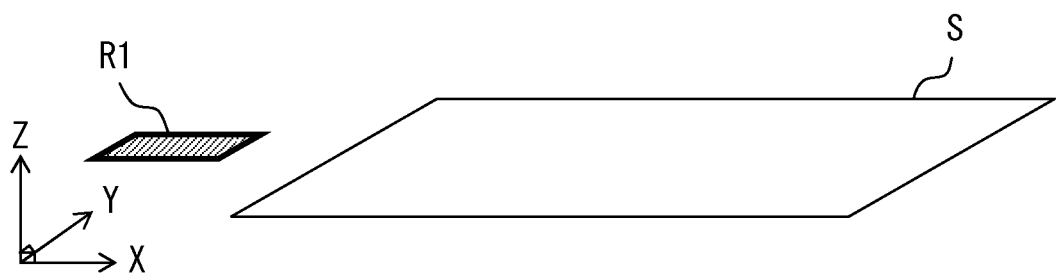
FIG. 8 is a diagram for explaining a setting process of a reference area performed before obtaining a time lapse image in the time lapse observation apparatus according to embodiment 2.

FIG. 7 is a flowchart presenting the process of the time lapse observation performed in the time lapse observation apparatus according to the present embodiment. FIG. 8 is a diagram for explaining the setting process of the reference area performed before obtaining the time lapse image in the time lapse observation apparatus according to the present embodiment. The time lapse observation apparatus according to the present embodiment differs from the time lapse observation apparatus 1 according to embodiment 1 in setting an area outside the image capturing target area as the reference area. The configuration of the time lapse observation apparatus according to the present embodiment is the same as the configuration of the time lapse observation apparatus 1.

Hereinafter, with reference to FIG, 7 and FIG. 8, the process flow of the time lapse observation apparatus according to the present embodiment is explained specifically focusing on the difference from the process flow in the time lapse observation apparatus 1 according to embodiment 1 illustrated in FIG. 4. Meanwhile, the same step number is assigned to the same process as the process described in FIG. 4, and explanation is omitted.

The process flow of the time lapse observation illustrated in FIG, 7 differs from the process flow illustrated in FIG. 4 in that the processes presented in step S23, step S24 and step S25 are added.

The time lapse observation apparatus according to the present embodiment moves the position of the observation area displayed by the display apparatus 9 to display a different area of the sample on the display apparatus 9, after setting the image capturing target area in step S2 (step S23).

Meanwhile, hereinafter, the position of the observation area before the movement in step S23 is described as the first position, and the position of the observation area after the movement in step S23 is described as the second position. The first position is the position of the observation area in obtaining the time lapse image, and the second position is the position of the observation area in obtaining the Z stack image.

Then, in step S3, as illustrated in FIG. 8, an area outside the image capturing target area S is set as the reference area R1. The reference area R1 is required to be an area whose positional relation with the image capturing target area S is maintained even when the sample moves. For this reason, an area that is significantly away from the image capturing target area S is not preferable, and the reference area R1 is set in the vicinity of the image capturing target area S. Meanwhile, as long as the positional relation with the image capturing target area S is maintained, the reference area R1 does not need to be positioned on the same plane (XY plane) as the image capturing target area S. In addition, to further suppress the damage given to the sample, it is set smaller than the image capturing target area S.

In addition, the time lapse observation apparatus according to the present embodiment moves the position of the observation area to the first position to change the observation area (step S24) after obtaining the Z stack image in step S5, and before waiting in step S12, moves the position of the observation area to the second position to change the observation area (step S25).

Meanwhile, when it is determined that a further movement of the observation area is required based on the amount of movement in the XY direction calculated in step S6, the position of the observation area may be further moved from the first position before obtaining the time lapse image.

As described above, by the time lapse observation apparatus according to the present embodiment, the same effect as the time lapse observation apparatus 1 according to embodiment 1 can be obtained. That is, in the time lapse observation, while suppressing the damage given to the sample, the time lapse image capturing a certain image capturing target area of a live sample can be obtained.

In addition, in the time lapse observation apparatus according to the present embodiment, since the reference area is set outside the image capturing target area, the damage to the image capturing part (image capturing area) of the sample may be further suppressed, compared with the time lapse observation apparatus 1 according to embodiment 1.

Embodiment 3

Figure 9:
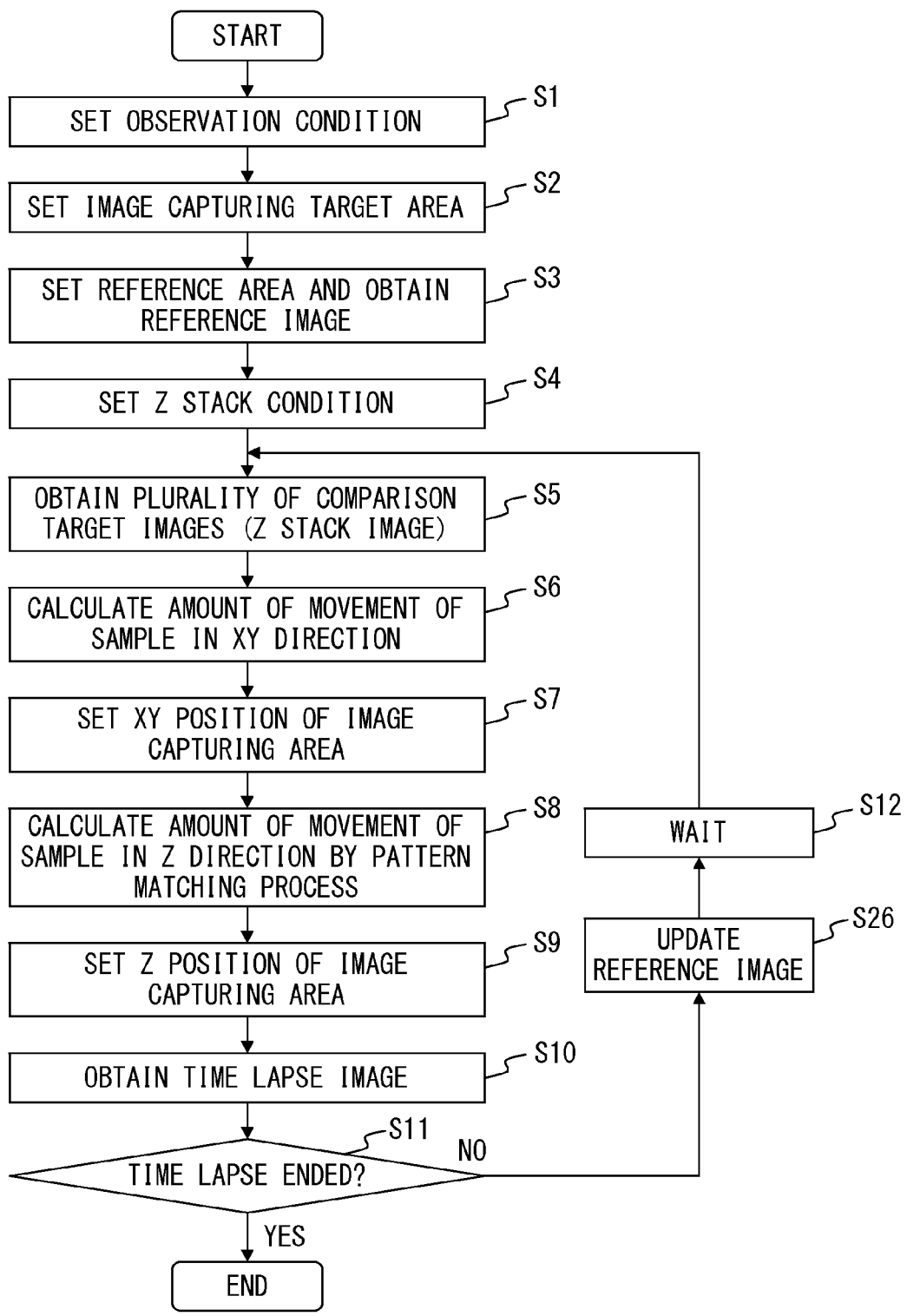
FIG. 9 is a flowchart presenting the process of a time lapse observation performed in a time lapse observation apparatus according to embodiment 3.

FIG. 9 is a flowchart presenting the process of the time lapse observation performed in the time lapse observation apparatus according to the present embodiment. The time lapse observation apparatus according to the present invention differs from the time lapse observation apparatus 1 according to embodiment 1 in updating the reference image by the comparison target image identified as the image with the highest correlation. The configuration of the time lapse observation apparatus according to the present embodiment is the same as the configuration of the time lapse observation apparatus 1.

Hereinafter, with reference to FIG. 9, the process flow of the time lapse observation apparatus according to the present embodiment is explained specifically focusing on the difference from the process flow in the time lapse observation apparatus 1 according to embodiment 1 illustrated in FIG. 4. Meanwhile, the same step number is assigned to the same process as the process described in FIG. 4, and explanation is omitted.

The process flow of the time lapse observation illustrated in FIG. 9 differs from the process illustrated in FIG. 4 in that the process presented in step S26 is added.

The time lapse observation apparatus according to the present embodiment updates, when it is determined in step S11 that the time lapse image has not been obtained for the certain time to obtain, the reference image stored in the image storing unit 8c by the comparison target image having the highest correlation identified by the pattern matching process performed in step S8 (step S26). According to this, the reference position stored in the observation condition storing unit 8b is also updated by the position of the image capturing area at the time when the comparison target image having the highest correlation is captured.

Meanwhile, instead of updating the reference image automatically by the comparison target image having the highest correlation, for example, the reference image before the update and the planned image for update (the comparison target image having the highest correlation) may be displayed by the display apparatus 9 next to each other, to let the user choose whether or not to update the reference image. In addition, in this case, in order to avoid delay and halt of the time lapse process, the configuration may be made so that, when no choice instruction from the user was input during a certain time interval, step S25 is terminated without updating the reference image or updating the reference image.

As described above, by the time lapse observation apparatus according to the present embodiment, the same effect as the time lapse observation apparatus 1 according to embodiment 1 can be obtained. That is, in the time lapse observation, while suppressing the damage given to the sample, the time lapse image capturing a certain image capturing target area of alive sample can be obtained.

Meanwhile, generally, in the time lapse observation targeted at a biological sample, not only the position of the sample but also the shape and color of the sample also change with the lapse of time. For this reason, the difference between the sample represented in the reference image obtained immediately after the start of the time lapse observation and the sample at the current point of time becomes larger with the lapse of time, and as a result, the correlation value obtained by the pattern matching also decreases. Such a condition decreased the judgment accuracy of the pattern matching, and may cause a decrease in the accuracy of the calculated amount of movement of the sample, With respect to such a challenge, according to the time lapse observation apparatus, since the reference image is updated every time when the time lapse image is obtained, the gap between the sample represented in the reference image obtained immediately after the start of the time lapse observation and the sample at the current point of time may be suppressed, and as a result, the decrease in the accuracy of the amount of movement of the sample caused with the lapse of the time may be suppressed. Therefore, compared with the time lapse observation apparatus according to embodiment 1, a certain area of the sample may be observed for a longer time.

FIG. 10 is a flowchart presenting a modification example of the process of the time lapse observation performed in the time lapse observation apparatus according to the present embodiment.

The process flow of the time lapse observation illustrated in FIG. 10 differs from the process flow of the time lapse observation apparatus illustrated in FIG. 9 in letting the user choose whether or not to update the reference image (step S27), in that the user sets the reference area again when updating the reference image to obtain the reference image again (step S28), and in setting the Z stack condition again (step S29). Meanwhile, the processes in step S28 and S29 are the same as the processes step S3 and step S4 illustrated in FIG. 9.

The time lapse observation apparatus according to the present embodiment is able to have, even when it is configured to perform the modification example of the process of the time lapse observation illustrated in FIG. 10, the same effect as when it is configured to perform the process in the time lapse observation illustrated in FIG. 9.

Embodiment 4

Figure 11B:
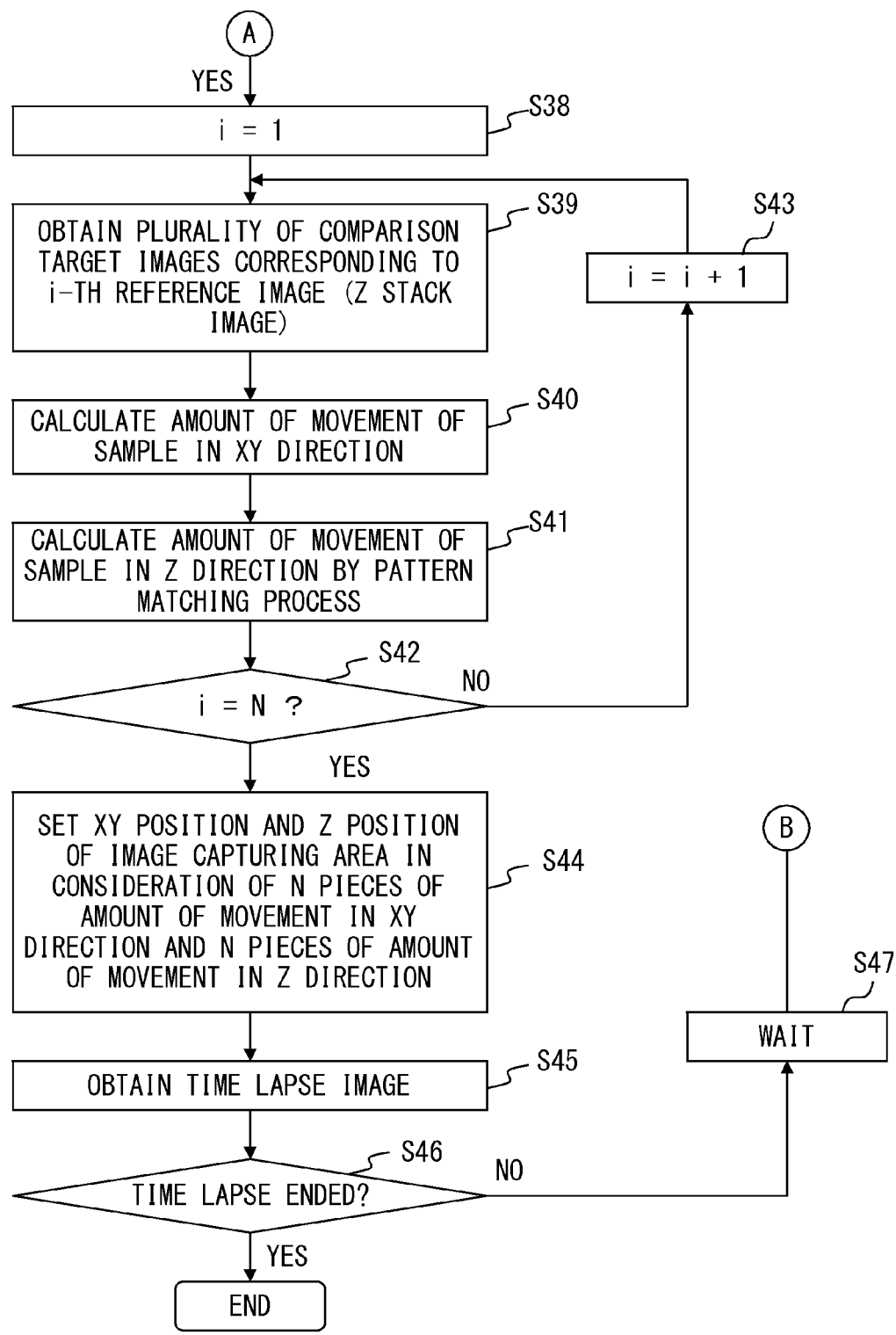

FIG. 11A and FIG. 11B are flowcharts presenting the process of the time lapse observation performed in the time lapse observation apparatus according to the present embodiment. FIG. 12 is a diagram for illustrating the setting process of the reference area performed before obtaining the time lapse image in the time lapse observation apparatus. The time lapse observation apparatus according to the present embodiment obtains a plurality of reference images by setting a plurality of reference areas with respect to an image capturing target area. Then, it differs from the time lapse observation apparatus 1 according to embodiment 1 in using the plurality of reference images to match the image capturing area with the image capturing target area on the sample. The configuration of the time lapser observation apparatus according to the present embodiment is the same as the configuration of the time lapse observation apparatus 1 according to embodiment 1 illustrated in FIG. 1.

With reference to FIG. 11A and FIG. 11B, the process flow of the time lapse observation apparatus is explained specifically.

First, in step S30, the observation condition of the time lapse observation apparatus is set by the user, and the observation condition storing unit 8b stores the set condition. In step S31, the area of the sample that should be imaged as the time lapse image is set as the image capturing target area by the user. The observation condition storing unit 8b stores the position (initial position) and the size of the image capturing target area at the time of the setting. Meanwhile, the processes in step S30, S31 are the same as the processes in step S1, step S2 illustrated in FIG. 4.

Next, the number N of the reference areas to be set is specified (step S32), and a temporary variable I to manage the number of the reference areas is set as i=1 (step S33).

In step S34, a partial area of the image capturing target area is set as the reference area by the user. The user sets the i-th reference area while viewing the image of the sample displayed by the display apparatus 9. The time lapse observation apparatus scans the set i-the reference area to capture the image, to obtain the i-th reference image. The image storing unit 8c stores the obtained i-th reference image. The observation condition storing unit 8b stores the position and size of the image capturing area at the time when the i-th reference image was captured as the i-th reference position, reference size. respectively.

In step S35, the condition to obtain the plurality of comparison target images being the Z stack images with respect to the i-th reference position (hereinafter, described as the Z stack condition) is set by the user, and the observation condition storing unit 8b stores the set i-th Z stack condition.

After that, whether or not the temporary variable i is i=N, that is, whether or not N pieces of reference images have been obtained is judged (step S36). When they have not been obtained, the temporary variable is incremented just by 1 (step S37), and the processes from step S34 to step S36 are repeated. Meanwhile, the processes in step S34 and step S35 correspond to the processes in step S3, step S4 illustrated in FIG. 4.

When obtaining of the N pieces of reference images is completed, the time lapse process performed at certain time intervals (time lapse interval) according to the set condition is started.

First, the temporary variable i to manage the number of the reference areas is set as i=1 again (step S38). Then, in step S39, the time lapse observation apparatus obtains a plurality of comparison target images corresponding to the i-th reference image. Specifically, the time lapse observation apparatus first obtains a plurality of comparison target images according the i-th reference position, reference size, Z stack condition (the number of Z stacks, the Z stack interval, the emitting intensity of the laser light, the scanning speed, the detection sensitivity) stored in the observation condition storing unit 8b. The image storing unit 8c stores the obtained plurality of comparison target images corresponding to the i-th reference image.

In step S40, the time lapse observation apparatus calculates the amount of movement of the sample in the XY direction. Specifically, the image processing unit 8d of the time lapse observation apparatus calculates the amount of movement of the sample in the XY direction by comparing the i-th reference image obtained in step S34 and the comparison target image corresponding to the i-th reference image obtained in step S39, for example, the comparison target image captured in the reference position.

In step S41, the time lapse observation apparatus performs the pattern matching process to calculate the amount of movement of the sample in the Z direction. Specifically, the image processing unit 8d of the time lapse observation apparatus performs the pattern matching process of the i-th reference image obtained in step S34 with each of the plurality of the comparison target images corresponding to the i-th reference image obtained in step S39, to obtain the correlation value of each comparison target image with the reference image. Then, from the relation of the Z position of the comparison target area from which the comparison target image having the highest correlation is captured and the Z position of the reference position, the amount of movement of the sample in the Z direction is calculated.

After that, whether or not the temporary variable i is i=N, that is, whether or not the amount of movement of the sample in each of the XY direction and the Z direction have been calculated for N pieces is judged (step S42). When they have not been calculated, the temporary variable i is incremented just by 1 (step S43), and the processes from step S39 to step S42 are repeated. Meanwhile, the processes in step S39, step S40, step S41 correspond to the processes in step S5, step S6, step S8 illustrated in FIG. 4.

In step S44, the time lapse observation apparatus sets the XY position and the Z position of the image capturing area to obtain the time lapse image. Specifically, the amount of movement of the sample in the XY direction and the amount of movement in the Z direction is recalculated in consideration of the N pieces of amount of movement in each of the XY direction and the Z direction. Then, the XY position and the Z position of the image capturing area to obtain the time lapse image are set to the position moved from the initial position by the amount of movement obtained by the recalculation.

In step S45, the time lapse observation apparatus obtains the time lapse image. Then, the image storing unit 8c stores the obtained time lapse image.

In step S46, whether or not the time lapse observation apparatus has obtained the time lapse image for the certain number to obtain stored in the observation condition storing unit 8b is judged.

When the time lapse image has not been obtained for the certain number to obtain, the time lapse observation apparatus waits until the next time lapse time approaches (step S47). Then, after that, the processes from step S38 to step S46 are repeated. On the other hand, when the time lapse image has been obtained for the certain number to obtain, the time lapse observation apparatus terminates the process.

As described above, by the time lapse observation apparatus according to the present embodiment, the same effect as the time lapse observation apparatus 1 according to embodiment 1 may be obtained. That is, in the time lapse observation, while suppressing the damage given to the sample, the time lapse image capturing a certain image capturing target area of a live sample can be obtained.

In addition, in the time lapse observation apparatus according to the present embodiment, since the amount of movement of the sample is calculated by setting a plurality of reference areas and using a plurality of reference images, the amount of movement of the sample may be calculated with a higher accuracy. Therefore, while suppressing the damage given to the sample, a time lapse image capturing a certain image capturing target area with a higher accuracy can be obtained.

Meanwhile, the processes performed in the time lapse observation apparatus according to embodiment 2 through embodiment 4 may be modified in various ways such as those illustrated in FIG. 5 and FIG. 6.

What is claimed is:

1. A time lapse observation method matching the image capturing area with an image capturing target area on a sample set in advance, capturing an image of the image capturing target area at certain time intervals, to obtain a time lapse image, comprising:

before a process to obtain the time lapse image for a first time, capturing an image of a reference area on the sample being a partial area of the image capturing target area or an area in a vicinity of the image capturing target area being a smaller area than the image capturing target area to obtain a reference image;

storing a position and a size of the image capturing area in capturing the reference image as a reference position, reference size respectively; and before a process to obtain the time lapse image performed at certain time intervals, setting a position of the image capturing area sequentially at a plurality of different positions in the optical axis direction of an objective including the reference position and capturing an image at each of the plurality of positions to obtain a plurality of comparison target images; and matching the image capturing area in obtaining the time lapse image with the image capturing target area, based on a comparison result of the reference image and the plurality of comparison target images.

2. The time lapse observation method according to claim 1, wherein:

the comparison target image with a highest correlation with the reference image is identified by a pattern matching process of the reference image and each of the plurality of comparison target images; and a position of the image capturing area in the optical axis direction in obtaining the time lapse image and a position of the image capturing target in the optical axis direction are matched, based on a positional relation of the comparison target image with the highest correlation and the reference image in the optical axis direction.

3. The time lapse observation method according to claim 2, wherein a position of the image capturing area in an XY direction orthogonal to the optical axis direction in obtaining the time lapse image and a position of the image capturing target area in the XY direction are matched, based on a comparison result of the reference image and the comparison target image with the highest correlation.

4. The time lapse observation method according to claim 2, wherein a position of the image capturing area in an XY direction orthogonal to the optical axis direction in obtaining the time lapse image and a position of the image capturing target area in the XY direction are matched, based on a comparison result of the reference image and the comparison target image captured at the reference position.

5. The time lapse observation method according to claim 2, wherein the plurality of comparison target images are obtained by irradiation with a smaller light amount per unit area compared with a light amount per unit area to irradiate the image capturing target area in obtaining the time lapse image.

6. In the time lapse observation method according to claim 5, wherein the plurality of comparison target images are obtained by irradiation for a shorter illumination time per unit area compared with a irradiation time per unit area to irradiate the image capturing target area with light in obtaining the time lapse image.

7. The time lapse observation method according to claim 6, wherein the plurality of comparison target images are obtained by a setting of a higher sensitivity of a detector compared with a setting of a sensitivity of the detector in obtaining the time lapse image.

8. The time lapse observation method according to claim 5, wherein the plurality of comparison target images are obtained by irradiation with light of a weaker intensity compared with an intensity of light to irradiate the image capturing target area in obtaining the time lapse image.

9. The time lapse observation method according to claim 2, further comprising:

every time when the time lapse image is obtained, updating the reference image, and updating the reference position by a position of the image capturing area at a time when the updated reference image was captured.

10. The time lapse observation method according to claim 9, wherein every time when the time lapse image is obtained, the reference image is updated by the comparison target image having the highest correlation identified by the pattern matching process from the plurality of comparison target images obtained before obtaining the last time lapse image, and the reference position is updated by a position of the image capturing area at a time when the updated reference image was captured.

11. The time lapse observation method according to claim 2, wherein by a movement of the objective in the optical axis direction, a position of the image capturing area in the optical axis direction in capturing the time lapse image and a position of the image capturing target area in the optical axis direction area matched.

12. The time lapse observation method according to claim 2, wherein by a movement of a stage on which the sample is placed in the optical axis direction, a position of the image capturing area in the optical axis direction in capturing the time lapse image and a position of the image capturing target area in the optical axis direction are matched.

13. The time lapse observation method according to claim 2, wherein by changing a scanning area of a scanning unit, a position of the image capturing area in an XY direction orthogonal to the optical axis direction in capturing the time lapse image and a position of the image capturing target area in the XY direction are matched.

14. The time lapse observation method according to claim 2, wherein by the movement of a stage on which the sample is placed in the XY direction orthogonal to the optical axis direction, a position of the image capturing area in the XY direction in capturing the time lapse image and a position of the image capturing target area in the XY direction are matched.

15. The time lapse observation method according to claim 2, wherein
   before a process to obtain the time lapse image for a first time,
      a plurality of reference areas are captured to obtain a plurality of reference images;
      a plurality of reference positions area stored; and
   before a process to obtain the time lapse image performed at certain time intervals,
      a plurality of comparison target images corresponding to each of the plurality of reference images are obtained; and
      the image capturing area in obtaining the time lapse image is matched with the image capturing target area, based on a comparison result of the plurality of reference images and the plurality of corresponding comparison target images.

16. The time lapse observation method according to claim 2, wherein
   each of the time lapse image and the comparison target image is a fluorescent image.

17. The time lapse observation method according to claim 2, wherein
   each of the time lapse image and the comparison target image is an SHG image.

18. A time lapse observation apparatus used for the method according to claim 2.

19. A multiphoton microscope used for the method according to claim 2.

* * * * *